United States Patent Office 3,594,119
Patented July 20, 1971

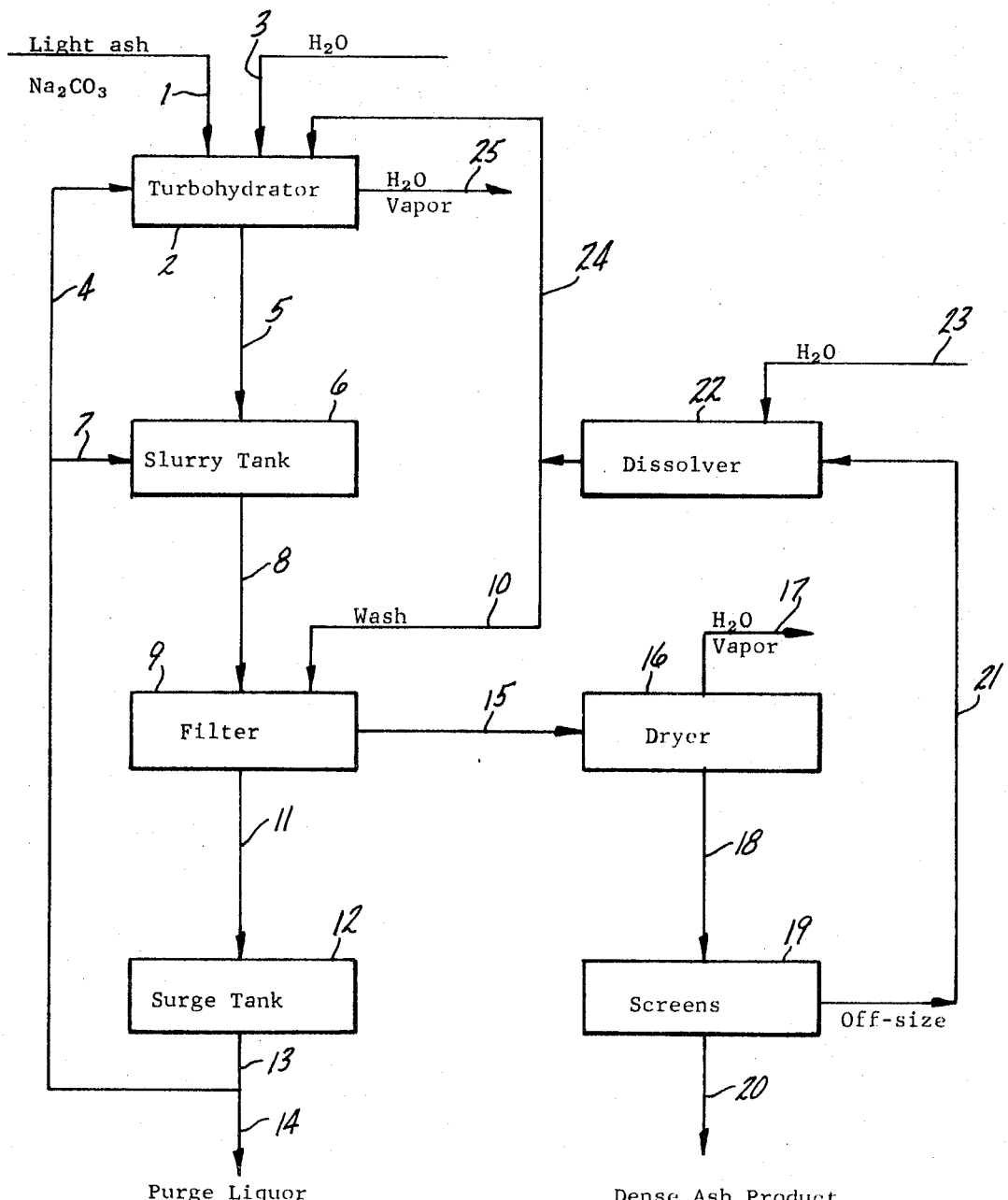

3,594,119
PROCESS FOR PURIFICATION OF SODIUM
CARBONATE CRYSTALS
Carl E. Pruiss, Madison, Conn., and James M. Ford, Cleveland, Tenn., assignors to Olin Mathieson Chemical Corporation
Filed Jan. 2, 1969, Ser. No. 788,563
Int. Cl. C01d 7/22
U.S. Cl. 23—63    7 Claims

ABSTRACT OF THE DISCLOSURE

Impure solid sodium carbonate monohydrate, formed by hydrating light soda ash in the solid phase with sufficient water to form the monohydrate, is purified by digesting a slurry of the impure crystals in an aqueous solution saturated with sodium carbonate monohydrate at temperatures below the transition point of the monohydrate to anhydrous sodium carbonate and separating the thus purified crystals of monohydrate from the slurry. Purified dense ash is produced by dehydrating the purified monohydrate.

---

This invention relates to a novel method of improving the purity and form of sodium carbonate.

Sodium carbonate is supplied to the chemical industry as light soda ash and dense soda ash, including ash synthesized by the ammonia-soda process and also that recovered from natural deposits and natural brines. Both of these materials contain certain impurities. Sodium carbonate produced by the ammonia-soda process contains small amounts, usually in the range of 0.1 to 1 percent by weight or more, of sodium chloride. Sodium carbonate produced from natural sources also contains sodium chloride and other impurities, including sodium sulphate, $SiO_2$ and boron compounds.

Light soda ash, as available commercially is a powdery material with a density of about 550 grams per liter. It contains appreciable amounts of impurities particularly sodium chloride which are largely on the surface of the crystals. The lightness and impurities of commercial soda ash make it generally unsuitable for use in glass making or in the foundry.

In many prior art processes, light ash, produced from natural sources or synthetically by the ammonia-soda process, is hydrated in turbohydrators, pug mills or other suitable equipment, to monohydrate. The light ash is mixed with excess hot water to form crystals of sodium carbonate monohydrate. This wet mass is then transferred to a dryer in which the free water and water of crystallization are removed leaving dense ash in the form of monohydrate skeletons. The resulting dense ash is no purer than the light ash from which it was made. The dense ash from the dryer must be screened, and the oversize must be ground to reduce it to satisfactory size. Grinding tends to form more dust fines and the ground particles are fuzzy and flow very poorly. Excessive fine material in the dryer discharge must be removed by screening or air classification and recycled. Combining the acceptable portions from the dryer and the grinder gives a dense ash which is usable, but poor with respect to flowability, dustiness, chemical purity, and particle shape. Excessive recycle of offsize particles materially increases the cost of this mode of operation.

The art has provided numerous methods for purifying soda ash wherein light ash is dissolved and heated to temperatures above the transition temperature to crystallize anhydrous ash or by crystallizing below the transition temperature to form monohydrate, leaving impurities in the liquor. The transition temperature of monohydrate to anhydrous soda ash is about 108° to 112° C. It is lowered by the presence of other solutes or pressure is applied in order to heat the solution above the transition temperature. The addition of other solutes adds to the cost and may contaminate instead of purify the soda ash. Otherwise pressure equipment is required to operate above the transition temperature.

According to one method of the prior art in U.S. Pat. 2,887,360, the purity and appearance of sodium carbonate may be materially improved by forming an aqueous slurry of crystals of sodium carbonate monohydrate and heating slurry at about 112° C., which is above the transition temperature, until the undissolved solid sodium carbonate suspended in the slurry is converted substantially completely to anhydrous sodium carbonate crystals. Thereafter, the slurry is cooled to produce a slurry of sodium carbonate monohydrate crystals. This solid sodium carbonate monohydrate is then separated from the mother liquor and a purer product having improved appearance is obtained.

U.S. Pat. 1,650,244 issued Nov. 22, 1927 describes a process for producing sodium carbonate monohydrate by introducing anhydrous, light soda ash into an established pool of aqueous solution saturated with sodium carbonate monohydrate at temperatures above 35° C. while precipitating solid monohydrate from the aqueous phase, separating and drying the monohydrate product.

U.S. Pat. 3,314,748 discloses the manufacture of dense ash including the step of adding light ash to an established pool aqueous slurry of monohydrate crystals below the transition temperature and separating from the slurry the monohydrate crystals of the desired size.

The low price of sodium carbonate makes only very low cost purification methods economically feasible. The present invention provides a method in which existing equipment and know-how is utilized in the production of the monohydrate. Further, the purification effected by the process of this invention does not require superatmospheric pressure or added solutes. This process is most inexpensive and effective.

The method of the present invention for purifying impure sodium carbonate monohydrate crystals comprises mixing said impure monohydrate crystals with a body of aqueous solution saturated with sodium carbonate monohydrate to form a slurry of said monohydrate crystals in said saturated solution; agitating and maintaining said slurry in a temperature range in which said monohydrate is the stable solid phase until said crystals are substantially purified and separating the thus purified crystals of sodium carbonate monohydrate from said aqueous solution.

In the slurry, the impurities in the monohydrate crystals are largely removed by leaching, the imperfections in the crystals are filled in and fragmentary structures are replaced by solid, uniform crystalline structures. The final product is more dense and less dusty and the chloride content is desirably reduced. The product is more satisfactory and more acceptable in the market for use in glass-making and for other purposes.

Temperatures of the slurry and of the liquor in the recycle lines and in the filter must be maintained in the range of about 35° C. to 108° C. Below 35° C., other hydrates, particularly the heptahydrate and the decahydrate may separate, clogging the lines and producing undesirable crystal forms mixed with the monohydrate crystals. Above the transition temperature of 108° C., monohydrate is converted to anhydrous $Na_2CO_3$ which frequently forms fine crystals and these tend to make the finished product dusty. Ordinarily, the process is carried out at atmospheric pressure in equipment open to the air. Under these conditions, the temperature is not likely to rise above 108° C.

The time of contact of the impure monohydrate with the slurry is controlled to produce the desired degree of purification. Ordinarily a minimum period of 10 minutes is considered adequate to effect purification satisfactory for many purposes. Somewhat longer periods result in better purity but, after one hour, little additional purification is effected. The suitable contact time in the slurry is thus from about 10 to 60 minutes.

The solids content of the slurry may vary suitably up to about 50% solids and still be adequately stirrable and pumpable, using suitable equipment. A solids content of about 30 to 35% is convenient and, in continuous operation, is maintained at about this level. In batch operation, the slurry is built up to about this level and the period of digestion is continued after the solids addition is completed until a satisfactory degree of purification is obtained.

In the accompanying figure, light soda ash is charged via line 1 to turbohydrator 2 together with water via line 3 and/or recycle mother liquor via line 4 and/or dissolved off-size product via line 24. The proportion of water introduced into turbohydrator 2 is sufficient to convert the anhydrous light ash to monohydrate and to make up vaporization losses via line 25. The monohydrate formed in turbohydrator 2 is discharged via line 5 into slurry tank 6 together with sufficient mother liquor introduced via line 7 to form a slurry containing up to about 50% solids. The solids content is adjusted to be conveniently pumpable, preferably about 35% solids. After suitable residence time in slurry tank 6, the slurry is transferred via line 8 to filter 9 and the solids are washed on the filter by an aqueous solution of sodium carbonate, preferably saturated with monohydrate, introduced via line 10. Filtrate and washings pass via line 11 to surge tank 12 and from there are recycled via lines 13 and 4 to turbohydrator 2 and via lines 13 and 7 to slurry tank 6. A portion of the filtrate is purged via line 14.

The solid monohydrate removed from filter 9 is transferred via line 15 to dryer 16. Water is discharged via line 17 and the dry dense ash particles are transferred via line 18 to screens 19. Dense ash product is removed via line 20. Offsize dense ash is returned via line 21 to dissolver 22. Water is added via line 23 preferably in suitable proportion to form a solution saturated with monohydrate. The solution is used via line 10 to wash monohydrate crystals on filter 9 and some is recycled via line 24 to turbohydrator 2 to furnish part of the required water as well as to recover the dissolved soda ash.

The operation thus described is a continuous operation but it can also be conducted batchwise, hydrating the light ash to monohydrate in the turbohydrator, transferring the entire batch to the slurry tank together with recycle solution, digesting it for a suitable period and filtering the entire batch, washing it and dumping the filter to the dryer.

EXAMPLE

In a process as shown in the attached figure, a stream of recycle liquor containing about 23% $Na_2CO_3$ and 3% NaCl at a temperature of 80° C. was charged to a turbohydrator at a rate of 5,469 lb./hr. A stream of 8,050 lb./hr. of soda ash solution prepared by dissolving off-size fines in water was also charged to the turbohydrator along with 50,530 lb./hr. of light soda ash containing about 0.16% NaCl at a temperature of 125° C. Residence time was about 10 minutes during which time excess water was driven off by the heat of reaction at the rate of 5,005 lb./hr. The damp solid monohydrate effluent from the turbohydrator at the rate of 65,794 lb./hr. was slurried with 132,000 lb./hr. of recycle liquor. Residence time in the slurry was 10 minutes and the temperature was maintained at about 85° C. (175° F.). Charged to the filter from the slurry tank was a mixture of 63,408 lb./hr. of monohydrate crystals and 134,386 lb./hr. of liquor consisting of about 74% water, 22.67% dissolved $Na_2CO_3$ and 3.14% dissolved NaCl. The monohydrate was washed on the filter with a saturated sodium carbonate solution (31%) made up by dissolving off-size dense ash in water. The washed monohydrate crystals amounting to 66,340 lb./hr. were transferred to the dryer and produced 50,000 lb./hr. of dense soda ash. The filtrate and washings were combined to produce the recycle liquor. Purging about 1.46% of the recycle maintained the NaCl content at about 3%. The NaCl in the light ash was about 0.16% and in the dense ash was about 0.04% on a dry basis.

What is claimed is:

1. The method of purifying impure sodium carbonate monohydrate crystals, formed by hydrating light soda ash in the solid phase with sufficient water to form impure monohydrate crystals, which comprises mixing said impure monohydrate crystals with a body of aqueous solution saturated with sodium carbonate monohydrate to form a slurry of said monohydrate crystals in said saturated solution; agitating and maintaining said slurry in a temperature range from 35° to 108° C. in which said monohydrate is the stable solid phase until said crystals are substantially purified and separating the thus purified crystals of sodium carbonate monohydrate from said aqueous solution.

2. The method as claimed in claim 1 in which said slurry contains up to about 50% solids by weight.

3. The method as claimed in claim 1 in which the time of contact of said crystals with said solution is at least 10 minutes.

4. The method as claimed in claim 1 in which the aqueous solution from which the thus purified crystals have been separated is recycled and forms the aqueous solution in which said impure crystals are slurried.

5. The method as claimed in claim 4 in which a portion of said aqueous solution is purged and replaced by a fresh aqueous solution of dissolved sodium carbonate.

6. The method as claimed in claim 1 in which said purified crystals of sodium carbonate monohydrate are dehydrated to dense, anhydrous sodium carbonate.

7. The method as claimed in claim 1 in which said light soda ash is produced by the ammonia-soda process.

References Cited

UNITED STATES PATENTS 2,962,348  11/1960  Seglin et al. _____ 23—302X
3,425,795  2/1969  Howard et al. _____ 23—63

FOREIGN PATENTS 1,009,378  11/1965  Great Britain _____ 23—63

OSCAR R. VERTIZ, Primary Examiner

G. O. PETERS, Assistant Examiner